US011485317B2

(12) United States Patent
Hutanu et al.

(10) Patent No.: US 11,485,317 B2
(45) Date of Patent: Nov. 1, 2022

(54) CONCEPT FOR PROVISION OF A KEY SIGNAL OR AN IMMOBILIZER SIGNAL FOR A VEHICLE

(71) Applicant: Volkswagen Aktiengesellschaft, Wolfsburg (DE)

(72) Inventors: Andrei Hutanu, Braunschweig (DE); Maurice Mücke, Wolfsburg (DE); Gerald Koch, Lengede (DE); Dmitri Dragunow, Dresden (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/418,047

(22) PCT Filed: Dec. 16, 2019

(86) PCT No.: PCT/EP2019/085279
§ 371 (c)(1),
(2) Date: Jul. 29, 2021

(87) PCT Pub. No.: WO2020/136029
PCT Pub. Date: Jul. 2, 2020

(65) Prior Publication Data
US 2022/0089120 A1 Mar. 24, 2022

(30) Foreign Application Priority Data
Dec. 27, 2018 (DE) ...................... 10 2018 010 140.2

(51) Int. Cl.
*B60R 25/20* (2013.01)
*B60R 25/24* (2013.01)
*B60R 25/01* (2013.01)

(52) U.S. Cl.
CPC .......... *B60R 25/2018* (2013.01); *B60R 25/24* (2013.01); *B60R 25/01* (2013.01);
(Continued)

(58) Field of Classification Search
CPC ..... B60R 25/2018; B60R 25/24; B60R 25/01; B60R 2325/101; B60R 2325/108; B60R 2325/205
See application file for complete search history.

(56) References Cited

U.S. PATENT DOCUMENTS 10,086,797 B2    10/2018  Krishnan et al.
2012/0164989 A1*  6/2012  Xiao ................... H04L 67/125
                                                         715/764

(Continued)

FOREIGN PATENT DOCUMENTS

CN      107689098 A     2/1918  ............ G06Q 30/06
DE    102017112273 A1  12/1917  ............ B60R 25/00

(Continued)

OTHER PUBLICATIONS

DE 102017112273 A1, U.S. Pat. No. 10,086,797 B2.
(Continued)

*Primary Examiner* — Thomas D Alunkal
(74) *Attorney, Agent, or Firm* — Slayden Grubert Beard PLLC

(57) ABSTRACT

A method for a device for a vehicle is disclosed, wherein the device comprises a key chip. The method comprises obtaining information relating to the release of a key signal or of an immobilizer signal from a central computer via a wireless mobile communication system. The method further comprises providing a control signal to the key chip based on the information relating to the release of the key signal or of the immobilizer signal, wherein the control signal is designed to allow the key chip to generate the key signal or the immo- (Continued)

bilizer signal. The method further comprises providing the key signal and/or the immobilizer signal, by the key chip, via a wireless communication link to a central locking system and/or an immobilizer system of the vehicle after the control signal is obtained.

20 Claims, 8 Drawing Sheets

(52) U.S. Cl.
CPC ... *B60R 2325/101* (2013.01); *B60R 2325/108* (2013.01); *B60R 2325/205* (2013.01)

(56) References Cited

U.S. PATENT DOCUMENTS

| | | | |
|---|---|---|---|
| 2012/0313796 A1 | 12/2012 | Lee et al. ...................... 340/989 |
| 2016/0055699 A1* | 2/2016 | Vincenti ............ G07C 9/00857 |
| | | | 340/5.61 |
| 2016/0098871 A1* | 4/2016 | Oz ......................... H04W 4/40 |
| | | | 340/5.61 |
| 2017/0053470 A1* | 2/2017 | Bergerhoff .............. H04W 4/48 |
| 2017/0178035 A1* | 6/2017 | Grimm ................ H04L 9/3213 |
| 2018/0076958 A1* | 3/2018 | Narimoto ............. H04L 9/0891 |
| 2018/0093641 A1 | 4/2018 | Decke et al. |
| 2019/0001926 A1* | 1/2019 | Arakawa ............... B60R 25/241 |

FOREIGN PATENT DOCUMENTS

| | | | |
|---|---|---|---|
| DE | 102016218986 A1 | 4/1918 | ............. B60R 25/24 |
| DE | 102018010140 A1 | 7/1920 | ............. B60R 25/24 |
| DE | 102014204762 A1 | 9/2015 | ............. H04L 12/66 |
| JP | 2018092323 A | 6/1918 | ............. B60R 25/24 |
| JP | 2012041712 A | 3/2012 | ............. E05B 19/00 |
| WO | 2016/054276 A1 | 4/1916 | ............. B60R 16/037 |
| WO | 2014/121811 A1 | 8/2014 | ............. B60R 25/20 |
| WO | 2020/136029 A1 | 7/2020 | ............. B60R 25/20 |

OTHER PUBLICATIONS

DE 102016218986 A1, US 2018/0093641 A1.
International Search Report and Written Opinion, Application No. PCT/EP2019/085279, 14 pages, dated Apr. 23, 2020.

* cited by examiner

CONCEPT FOR PROVISION OF A KEY SIGNAL OR AN IMMOBILIZER SIGNAL FOR A VEHICLE

CROSS-REFERENCE TO RELATED APPLICATIONS

This application claims priority to German Patent Application No. DE 10 2018 010 140.2, filed on Dec. 27, 2018 with the German Patent and Trademark Office. The contents of the aforesaid patent application are incorporated herein for all purposes.

TECHNICAL FIELD

The present invention relates to a method for a device for a vehicle, to the device for the vehicle, to a method and a device for a central computer, to a method and a device for a mobile device, and to corresponding computer programs.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The use of vehicles in a car-sharing or car-on-demand scenario is becoming ever more popular. This often allows a user of the vehicle to unlock and start the vehicle via a radio card or via a mobile device. In order to be able to use vehicles in such scenarios, it is often necessary for the vehicles to comprise security functions in order to prevent unauthorized opening or unauthorized start-up. These are already integrated in some vehicles, in vehicles in which these scenarios were not considered during design, however it may be required to retrofit corresponding functions. Some providers use an approach in which a mobile device or radio card is only used to open the vehicle, and a vehicle key is stored in the car itself.

As a result, it may be possible that a vehicle key of this kind may fall into the hands of a vehicle thief in the event of a break-in.

SUMMARY

An object exists to provide improved systems, devices, and/or methods that allow improved use of vehicles in car-sharing scenarios, (even) in the case of vehicles in which such functions were not included from the start.

This object is solved by the subject matter of the independent claims. Embodiments of the invention are described in the dependent claims, the following description, and the drawings.

DESCRIPTION

Figure 1A:
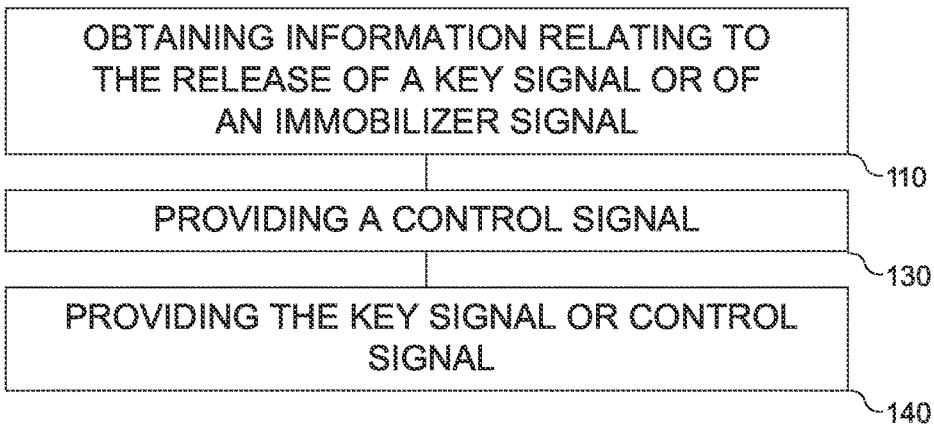
FIGS. 1a and 1b are flow diagrams of exemplary embodiments of a method for a device for a vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Exemplary embodiments provide a device for a vehicle. Said device, also referred to in the following as a CDIS (Car on Demand Interim Solution) box, may be used to control a central locking system and/or an immobilizer of the vehicle. Said device comprises a key chip, which may be designed in a similar manner to a key chip of a vehicle key, but comprises (e.g., tamper-proof) firmware that only provides the corresponding key signals or immobilizer signals if release was previously granted for the corresponding signals by means of a central computer via a wireless mobile communication system, i.e. by means of a server of the vehicle manufacturer, for example. If said release has been granted, the key chip is instructed to provide the corresponding signals to the immobilizer system or central locking system via a wireless communication link, in a similar manner to a vehicle key. A mobile device that communicates directly with the device via another wireless communication link may serve as the trigger.

Exemplary embodiments thus provide a method for a device for a vehicle. The device comprises a key chip. The method comprises obtaining information relating to the release of a key signal and/or of an immobilizer signal from a central computer via a wireless mobile communication system. The release of the key signal indicates release, by means of the central computer, of a function for unlocking or locking a central locking system of the vehicle. The release of the immobilizer signal indicates release, by means of the central computer, of a function for deactivating or activating an immobilizer. The method further comprises providing a control signal to the key chip based on the information relating to the release of the key signal or of the immobilizer signal. The control signal is designed to allow the key chip to generate (or provide) the key signal or the immobilizer signal. The method further comprises providing the key signal and/or the immobilizer signal, by means of the key chip, via a wireless communication link to a central locking system and/or an immobilizer system of the vehicle after the control signal is obtained.

By releasing the key signal and/or the immobilizer signal by means of the central computer, the key chip may be prevented from being misused. In addition, by transmitting the key signal or the immobilizer signal via a wireless communication link, the device may also be used as a retrofit solution in vehicles.

For example, the key signal may be transmitted via a wireless high-frequency communication link. The immobilizer signal may be transmitted via a wireless low-frequency communication link. This enables transmission of the signals via the communication links also used by a vehicle key.

In this regard, the key signal may be similar to a wireless key signal of a vehicle key of the vehicle. The immobilizer signal may be similar to a wireless immobilizer signal of the vehicle key of the vehicle. The key chip may be similar to a key chip of a vehicle key of the vehicle. This makes it possible to provide the device as a retrofit solution.

The method may further comprise obtaining identity information of a user of the vehicle from a mobile device of the user via another wireless communication link. The information relating to the release of the key signal may include information relating to a user for whom the key signal and/or the immobilizer signal is/are to be released. The control signal may be provided if the information relating to the user matches the identity information. This allows the user to authenticate themselves to the device (for example the CDIS box) in order to gain access to the immobilizer and/or central locking function.

For example, the information relating to the release of the key signal includes information relating to a period of time for which the release of the key signal and/or of the immobilizer signal is granted. The control signal may be provided within said period of time. This makes it possible to temporarily store the information relating the release of the key signal over multiple reservation periods in order, for example, to enable operation if the device has no immediate access to the wireless mobile communication system. In some exemplary embodiments, the information relating to the release of the key signal includes cryptographic key information. The identity information may correspond to an encrypted token. The encrypted token may come from the central computer. The method may further comprise verifying the encrypted token based on the cryptographic key information. By providing the encrypted token by means of the central computer, the mobile device of the user may be granted access without fear of the mobile device being tampered with. If the encrypted token is additionally signed by the mobile device, it even does not matter if the token is stolen.

The method may further comprise communicating with a mobile device of the user via another wireless communication link. The method may comprise providing the mobile device with access to functions of the central locking system based on the information relating to the release of the key signal. Alternatively or additionally, the method may comprise providing the mobile device with access to functions of an electric immobilizer based on the information relating to the release of the immobilizer signal. Alternatively or additionally, the method may comprise providing data of a vehicle communication system of the vehicle to the mobile device. This enables the user to use the vehicle via the mobile device in a car-on-demand scenario.

For example, the immobilizer signal may be provided to the immobilizer system of the vehicle in order to deactivate an immobilizer of the vehicle. The key signal may be provided to the central locking system of the vehicle in order to lock or unlock at least one body panel of the vehicle. The immobilizer signal may be provided to the immobilizer system of the vehicle in order to enable start-up (starting) of the vehicle. This makes it possible to use the device as a retrofit solution in a car-on-demand scenario.

In at least some exemplary embodiments, the control signal is provided to the key chip by means of a control module of the device. Transmission of the control signal by means of the control module may be cryptographically secured. This makes it possible to cryptographically couple the control module and the key chip such that generation of the control signal by means of another entity, for example an attacker, is made difficult or impossible.

Exemplary embodiments further provide a method for a central computer. The method comprises providing information relating to the release of a key signal or of an immobilizer signal to a device of a vehicle via a wireless mobile communication system. The release of the key signal indicates release, by means of the central computer, of a function for unlocking or locking a central locking system of the vehicle. Alternatively or additionally, the release of the immobilizer signal indicates release, by means of the central computer, of a function for deactivating or activating an immobilizer. The release relates to a key signal or an immobilizer signal that is provided to an immobilizer module or central locking system of the vehicle via a wireless communication link inside the vehicle if the key signal or immobilizer signal is released by the central computer. By releasing the key signal or the immobilizer signal by means of the central computer, the key chip may be prevented from being misused. In addition, by transmitting the key signal or the immobilizer signal via a wireless communication link, the device may also be used as a retrofit solution in vehicles.

For example, the information relating to the release of the key signal or of the immobilizer signal may include cryptographic key information. The method may further comprise providing an encrypted token to a mobile device of a user of the vehicle. The encrypted token and the cryptographic key information may be based on the same cryptographic key. The encrypted token may be provided to the mobile device in order to be forwarded to the device of the vehicle. By providing the encrypted token by means of the central computer, the mobile device of the user may be granted access without fear of the mobile device being tampered with. If the encrypted token is additionally signed by the mobile device, it even does not matter if the token is stolen.

Exemplary embodiments further provide a method for a mobile device. The method comprises providing identity information of a user of a vehicle from the mobile device of the user to a device of the vehicle via a wireless communication link. The identity information is provided to the device of the vehicle in order to be compared with information relating to a user for whom a key signal or an immobilizer signal is to be released, such that the key signal or immobilizer signal is provided to an immobilizer module or central locking system of the vehicle via a wireless communication link inside the vehicle if the information relating to the user matches the identity information. By releasing the key signal or the immobilizer signal by means of the central computer, the key chip may be prevented from being misused. In addition, by transmitting the key signal or the immobilizer signal via a wireless communication link, the device may also be used as a retrofit solution in vehicles. By providing the identification information, the user of the mobile device may be authenticated to the device (for example the CDIS box) in order to gain access to the vehicle.

For example, the identity information may correspond to an encrypted token. The method may further comprise receiving the encrypted token from a central computer in order to forward said token to the vehicle. By providing the encrypted token by means of the central computer, the mobile device of the user may be granted access without fear of the mobile device being tampered with. If the encrypted token is additionally signed by the mobile device, it even does not matter if the token is stolen. Exemplary embodiments further provide a computer program for executing one of the methods if the computer program runs on a computer, a processor, or a programmable hardware component.

Exemplary embodiments further provide a device for a vehicle. The device comprises a key chip. The device comprises at least one interface that is designed to communicate via a wireless mobile communication system. The device comprises a control module that is designed to obtain information relating to the release of a key signal or of an immobilizer signal from a central computer via the wireless mobile communication system. The release of the key signal indicates release, by means of the central computer, of a function for unlocking or locking a central locking system of the vehicle. Alternatively or additionally, the release of the immobilizer signal indicates release, by means of the central computer, of a function for deactivating or activating an immobilizer. The control module is designed to provide a control signal to the key chip based on the information relating to the release of the key signal or of the immobilizer signal. The control signal is designed to allow the key chip to generate (or provide) the key signal or the immobilizer signal. The key chip is designed to provide the key signal and/or the immobilizer signal to a central locking system and/or an immobilizer system of the vehicle via a wireless communication link after obtaining the control signal.

Exemplary embodiments further provide a device for a central computer. The device comprises at least one interface that is designed to communicate via a wireless mobile communication system. The device further comprises a control module that is designed to provide information relating to the release of a key signal or of an immobilizer signal to a device of a vehicle via the wireless mobile communication system. The release of the key signal indicates release, by means of the central computer, of a function for unlocking or locking a central locking system of the vehicle. Alternatively or additionally, the release of the immobilizer signal indicates release, by means of the central computer, of a function for deactivating or activating an immobilizer. The release relates to a key signal or an immobilizer signal that is provided to an immobilizer module or central locking system of the vehicle via a wireless communication link inside the vehicle if the key signal or immobilizer signal is released by the central computer.

Exemplary embodiments further provide a device for a mobile device. The device comprises at least one interface that is designed to communicate via a wireless communication link. The device comprises a control module that is designed to provide identity information of a user of a vehicle from the mobile device of the user to a device of the vehicle via the wireless communication link. The identity information is provided to the device of the vehicle in order to be compared with information relating to a user for whom a key signal or an immobilizer signal is to be released, such that the key signal or immobilizer signal is provided to an immobilizer module or central locking system of the vehicle via a wireless communication link inside the vehicle if the information relating to the user matches the identity information.

Additional embodiments are described in greater detail below with reference to the exemplary embodiments shown in the drawings, to which exemplary embodiments are in general however not entirely restricted.

Various exemplary embodiments will now be described in greater detail with reference to the accompanying drawings in which a few exemplary embodiments are shown.

In the following description of the accompanying FIGS. that only show a few exemplary embodiments, the same reference numbers may describe the same or comparable components. Furthermore, summary reference numbers may be used for components and objects that appear several times in an exemplary embodiment or in a drawing but that are jointly described with regard to one or more features. Components or objects that are described with the same or summary reference numbers may be designed the same but also perhaps differently with respect to an individual, several or all features, for example its dimensions, if not otherwise revealed explicitly or implicitly in the description.

Although exemplary embodiments may be modified and changed in different ways, exemplary embodiments are shown as examples in the FIGS. and will be described in detail in this context. It should, however, also be noted that it is not intended to restrict exemplary embodiments to the disclosed; rather, the exemplary embodiments are to cover all functional and/or structural modifications, equivalents and alternatives that lie within the scope of the invention. In the description and FIGS., equivalent reference numbers refer to equivalent or similar elements. Specific references to components, process steps, and other elements are not intended to be limiting.

If not otherwise defined, all of the terms used herein (including technical and scientific terms) have the same meaning that an average person in the art in the field to which the exemplary embodiments belong would attribute to them. It should further be noted that expressions such as those that are defined in generally used dictionaries should be interpreted as if they had the meaning that is consistent with their meaning in the context of the relevant field, and are not to be interpreted in an idealized or excessively formal sense as long as this is not expressly defined herein.

Figure 1B:
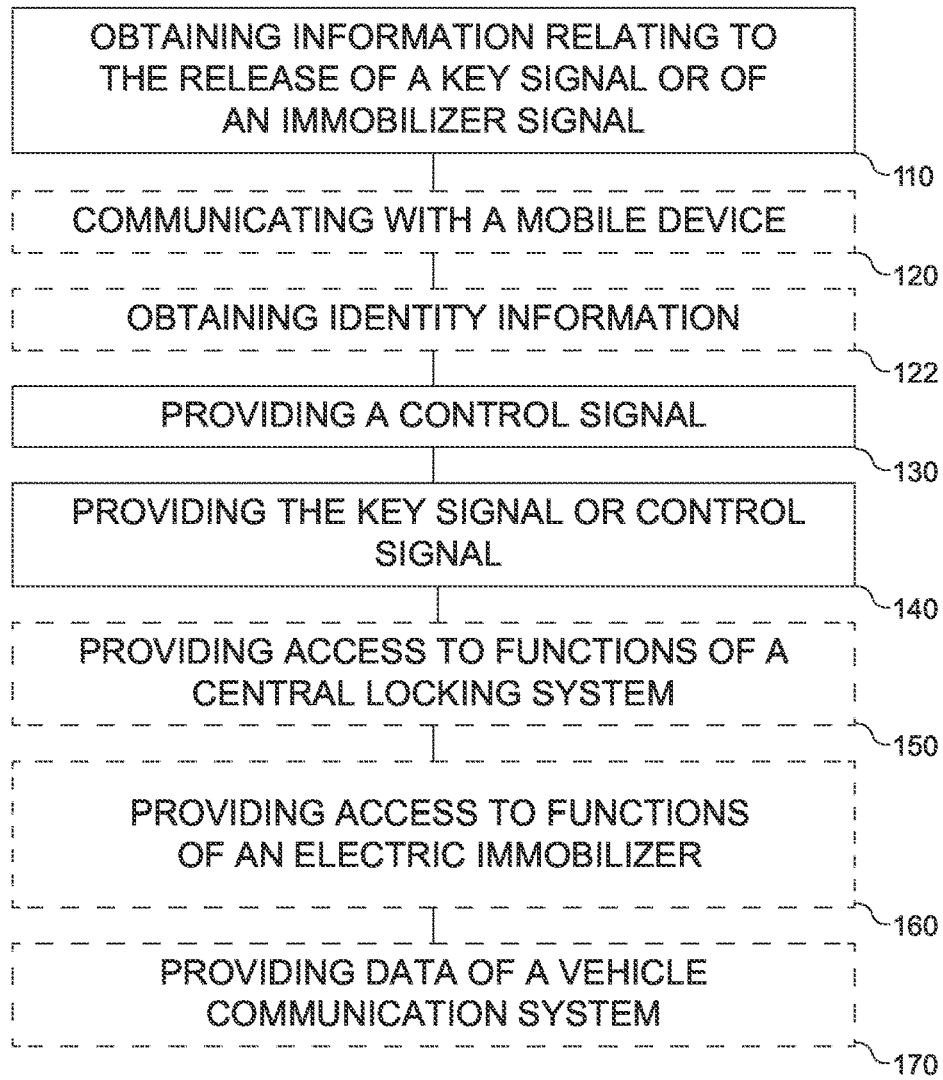

FIGS. 1a and 1b are flow diagrams of exemplary embodiments of a method for a device 10 for a vehicle. The device 10 comprises a key chip 12. The device 10 with the key chip 12 is introduced in FIG. 1c. The method comprises obtaining 110 information relating to the release of a key signal or of an immobilizer signal from a central computer via a wireless mobile communication system. The release of the key signal indicates release, by means of the central computer, of a function for unlocking or locking a central locking system of the vehicle. Additionally or alternatively, the release of the immobilizer signal indicates release, by means of the central computer, of a function for deactivating or activating an immobilizer. The method further comprises providing 130 a control signal to the key chip 12 based on the information relating to the release of the key signal or of the immobilizer signal. The control signal is designed to allow the key chip to generate (or provide) the key signal or the immobilizer signal. The immobilizer secret is located, for example, in the key chip and is only released if authorized/released by the central computer. The method further comprises providing 140, by means of the key chip, the key signal and/or the immobilizer signal via a wireless communication link to a central locking system 50 and/or an immobilizer system 40 of the vehicle after the control signal is obtained. The central locking system 50 and the immobilizer system 40 are also shown in FIG. 1c.

Figure 1C:
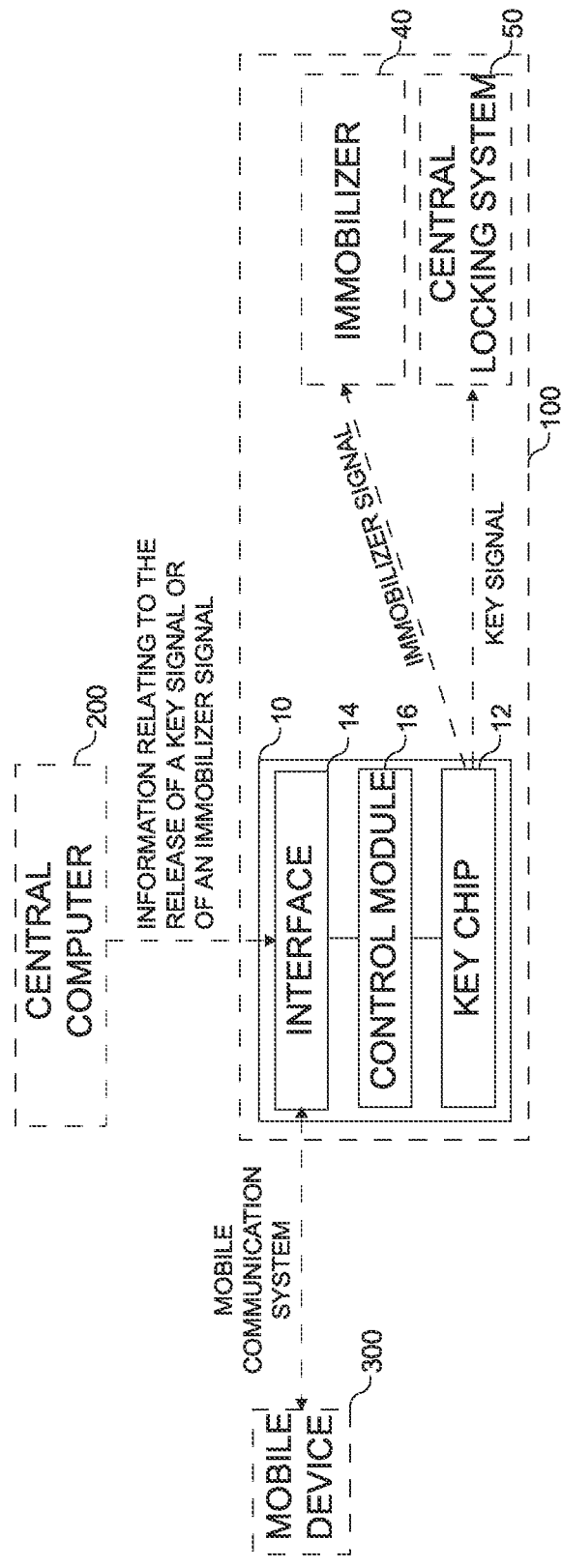
FIG. 1c is a block diagram of an exemplary embodiment of a device for a vehicle.

FIG. 1c is a block diagram of an exemplary embodiment of a (corresponding) device 10 for a vehicle 100. The device 10 comprises a key chip 12. The device 10 comprises at least one interface 14 that is designed to communicate via a wireless mobile communication system. The device 10 comprises a control module 16 that is designed to obtain information relating to the release of a key signal or of an immobilizer signal from a central computer 200 via the wireless mobile communication system. The control module 16 is coupled to the key chip 12 and to the at least one interface 14. The control module 16 may be designed to carry out the method, for example using the at least one interface and the key chip. The control module is further designed to provide a control signal to the key chip 12 based on the information relating to the release of the key signal or of the immobilizer signal. The control signal is designed to allow the key chip to generate (or provide) the key signal or the immobilizer signal. The key chip 12 is designed to provide the key signal and/or the immobilizer signal via a wireless communication link to a central locking system 50 and/or immobilizer system 40 of the vehicle 100 after obtaining the control signal. FIG. 1c also shows the vehicle 100 comprising the device 10, the central locking system 50 and the immobilizer system 40.

The following description relates to the method from FIGS. 1a and 1b and to the device 10 from FIG. 1c.

At least parts of the teachings herein relate to the device 10. In at least some exemplary embodiments, the device 10 is a retrofitted car-on-demand device (for example a CDIS box) for a vehicle. The device 10 may be an access device 10. The device 10 may allow a user of the car-on-demand service to unlock the vehicle and put same into operation.

For this purpose, the method comprises obtaining 110 (for example receiving) the information relating to the release of the key signal or of the immobilizer signal from the central computer via the wireless mobile communication system. In at least some exemplary embodiments, the wireless mobile communication system is a cellular mobile communication system. The wireless mobile communication system may for example be a mobile radio system from the group consisting of a Global System for Mobile telecommunications (GSM), General Packet Radio Service (GPRS), Enhanced Data rates for GSM Evolution (EDGE), Universal Mobile Telecommunications System (UMTS), Long-Term Evolution (LTE), Long-Term Evolution Advanced (LTE-A), and a fifth generation (5G) mobile radio system. In some exemplary embodiments, the information relating to the release of the key signal may be obtained via a mobile device 300. The mobile device 300 may for example temporarily store the information relating to the release of the key signal or provide a link to the central computer for the device 10. The central computer may for example correspond to a server (service computer) or a group of servers. In at least some exemplary embodiments, the term "central computer" is used for a group of computers (servers) that cooperate in order to provide the information relating to the release of the key signal. Said group of computers may for example include a server of a manufacturer of the vehicle, a server of a provider of the car-on-demand service, and/or a trustworthy central entity. In this context, in at least some exemplary embodiments, the information relating to the release may be provided by means of cooperation between the server of the manufacturer, the server of the provider and the trustworthy central entity, for example by means of the server of the manufacturer of the vehicle.

The release of the key signal indicates release, by means of the central computer, of a function for unlocking or locking a central locking system of the vehicle. The release of the immobilizer signal also indicates release, by means of the central computer, of a function for deactivating or activating an immobilizer. The release may for example relate to the device 10. For example, the release of the key signal may authorize the device 10 to provide the key signal (for example under certain conditions) (the same applies to the immobilizer signal). If the key signal has not been released, the device 10 (for example the key chip 12) may be prevented from providing the key signal (the same applies to the immobilizer signal).

The method further comprises providing 130 the control signal to the key chip 12 based on the information relating to the release of the key signal or of the immobilizer signal. In at least some exemplary embodiments, the control signal is provided 130 to the key chip by means of the control of the device. Transmission of the control signal may be cryptographically encrypted by means of the control module. In other words, the control signal may be cryptographically secured. The control module may be designed to transmit the control signal to the key chip in cryptographically secured form. The control module and the key chip may for example be arranged on the same printed circuit board. The control signal may be cryptographically secured during transmission of the control signal via tracks of the printed circuit board. For example, control commands that are transmitted via the control signal may be cryptographically encrypted or cryptographically signed. The control signal may for example be cryptographically secured based on a cryptographic secret. For example, the control module may comprise a trusted platform module (TPM) or a hardware security module (HSM) or have access to such a module. The TPM/HSM may comprise the secret cryptographic key.

The control signal is designed to allow the key chip to generate the key signal or immobilizer signal. For example, the key chip may be designed to only generate the key signal and/or the immobilizer signal if a (valid/authentic) control signal is provided to the key chip. In this context, "authentic" means that the control signal actually comes from the device, or rather control module. In this context, "valid" means that a security feature of the control signal, for example the cryptographic securing mechanism, is intact. For example, the key chip may comprise a memory for a immobilizer secret and/or for a central locking system secret. The key chip may comprise a security function that (only) grants the key chip access to the immobilizer secret and/or central locking system secret if a (valid/authentic) control signal is provided to the key chip. The key chip may be designed to (only) grant the key chip access to the immobilizer secret and/or central locking system secret if a (valid/authentic) control signal is provided to the key chip.

The method further comprises providing 140, by means of the key chip, the key signal or the immobilizer signal via a wireless communication link to a central locking system 50 or an immobilizer system 40 of the vehicle after the control signal is obtained. In general, immobilizer signals and key signals are transmitted by means of a vehicle key in different frequency bands. For example, key signals are frequently transmitted in the high-frequency range (radio frequency, RF) at around 400 MHz, whereas immobilizer signals are frequently transmitted in the low-frequency range (LF) at around 100 kHz. As such, the key signal may be transmitted by means of a wireless high-frequency communication link, and the immobilizer signal may be transmitted by means of the key chip via a low-frequency communication link. Both signals may correspond to the signals transmitted by means of a corresponding vehicle key. For example, the key signal may be similar (i.e. roughly correspond) to a wireless key signal of a vehicle key of the vehicle. The immobilizer signal may be similar (i.e. roughly correspond) to a wireless immobilizer signal of the vehicle key of the vehicle. In this context, "similar" may relate, for example, to a frequency, a coding and/or a security function of the key signal and/or immobilizer signal. In addition, the key chip may be similar or roughly correspond to a key chip of a vehicle key of the vehicle. However, the firmware or programming of the key chip may be the exception here. The firmware or programming of the key chip may instruct the key chip to only provide the key signal and/or the immobilizer signal if a (valid/authentic) control signal is provided to the key chip.

The key chip is designed to provide the key signal and/or the immobilizer signal after obtaining the control signal. The key chip may further be designed to check the control signal in order to determine an authenticity or validity of the control signal. The key chip may for example determine the authenticity or validity of the control signal based on the cryptographic securing mechanism for the control signal. The key chip may be designed to provide the key signal and/or the immobilizer signal after obtaining the control signal if the control signal is authentic/valid.

The key signal and/or the immobilizer signal is/are provided to the respective systems in order for access to be gained to various functions of the vehicle. For example, the immobilizer signal may be provided 140 to the immobilizer system 40 of the vehicle in order to deactivate (or activate) an immobilizer of the vehicle. The key signal may be provided 140 to the central locking system 50 of the vehicle in order to lock or unlock at least one body panel (for example a door or trunk lid) of the vehicle. The immobilizer signal may be provided 140 to the immobilizer system 40 of the vehicle in order to allow (keyless) start-up of the vehicle. If the immobilizer signal is provided to an immobilizer system of a vehicle that requires a mechanical key to be started, a mechanical key bit (without electronics) may be used for the start-up.

In principle, the immobilizer system and/or the central locking system may be remote-controlled by means of the central computer alone, i.e. the central computer may instruct the device to unlock the vehicle or deactivate the immobilizer. In at least some exemplary embodiments, the method further comprises direct communication of the device with a mobile device of a (potential) user of the vehicle. In this case, the central computer may grant release of the key signal for said user, and the user may authenticate themselves to the vehicle via their mobile device (for example a smartphone (programmable telephone), a tablet or a wearable such as a smartwatch) and then use the released function.

As shown in FIG. 1b, the method may further comprise communication 120 with a mobile device 300 of the user via another wireless communication link. The other wireless communication link may for example correspond to a wireless short-range radio communication link. For example, the wireless communication link may be based on Bluetooth, for example Bluetooth Low Energy (BTLE) or near-field communication (NFC). The method may comprise providing 150 the mobile device with access to functions of the central locking system based on the information relating to the release of the key signal. The functions of the central locking system may for example include locking and/or unlocking the vehicle. The method may further comprise providing 160 the mobile device with access to functions of an electric immobilizer based on the information relating to the release of the immobilizer signal. The functions of the immobilizer may for example include deactivating or activating an immobilizer and/or activating keyless driving. The method may further comprise providing 170 data of a vehicle communication system of the vehicle to the mobile device. In this regard, the data of the vehicle communication system may only be read out and not modified. The data of the vehicle communication system may for example correspond to data of a CAN (controller area network, vehicle bus for data of the vehicle) of the vehicle.

In order for the user to gain access to the vehicle via their mobile device, said user may authenticate themselves to the vehicle. The authentication of the mobile device of the user may for example be based on identity information of the user. As shown in FIG. 1b, the method may further comprise obtaining 122 the identity information of the user from a mobile device of the user via the other wireless communication link. The information relating to the release of the key signal may comprise information relating to the user for which the key signal and/or the immobilizer signal is/are to be released. The control signal (and thus also the key signal/immobilizer signal) may be provided 130 if the information relating to the user matches the identity information.

In order to secure this authentication of the mobile device of the user, an encrypted token may for example be used as the identity information. The encrypted token may for example come from the central computer, for example from a trustworthy central entity of the central computer, i.e. generated by the central computer based on a cryptographic key, for example. Alternatively, the token may be generated by the trustworthy central entity of the central computer and provided directly to the device for the vehicle by means of the server of the vehicle manufacturer or a service provider of the central computer, for example in cases in which the mobile device of the user does not communicate directly with the device but rather via the server of the vehicle manufacturer or service provider. The information relating to the release of the key signal may include cryptographic key information. The device (for example the control module) may then use the cryptographic key information to verify the encrypted token. The verification of the encrypted token may for example include checking whether the cryptographic key information and the encrypted token come from the same cryptographic key (for example the private key of the central computer). In other words, the method may further comprise verifying the encrypted token based on the cryptographic key information.

Furthermore, the release may only be granted for a particular time. For example, in a car-sharing scenario, in which the vehicle is assigned to the users via a succession of multiple, short-term reservations, the release is granted in advance for a plurality of reservations, for example in order to account for the case in which the vehicle then cannot establish a connection with the central computer when a user wants to gain access. In other words, the release of the key signal or of the immobilizer signal may be granted in advance by the central computer, for example prior to obtaining the identity information from the mobile device. As such, the information relating to the release of the key signal may include information relating to a time period for which the release of the key signal and/or immobilizer signal is granted (in advance). The control signal (and thus also the immobilizer signal and/or key signal) may (only) be provided within said time period. After said time period has elapsed, the method may further comprise activating the immobilizer, for example in order to stop the vehicle after the end of the rental process. A grace period may also be granted for this purpose. Alternatively, the method may further comprise requesting the release of the key signal or of the immobilizer signal based on the identity information obtained, for example after the identity information has been obtained.

Figure 2A:
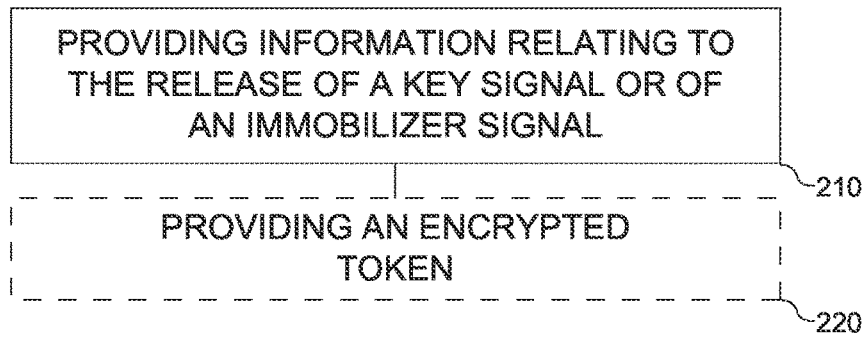
FIG. 2a is a flow diagram of an exemplary embodiment of a method for a central computer.
Figure 2B:
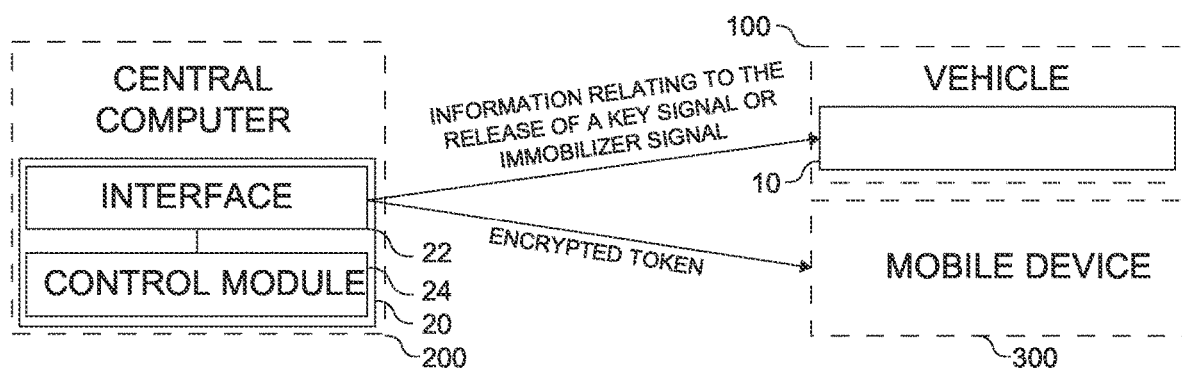
FIG. 2b is a block diagram of an exemplary embodiment of a device for a central computer.
Figure 3A:
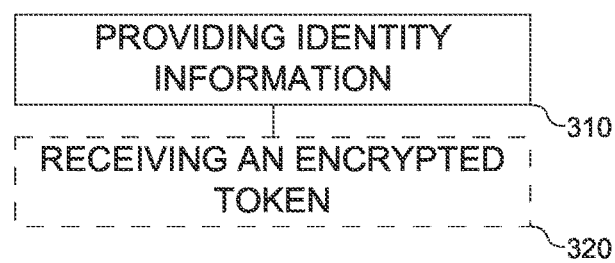
FIG. 3a is a flow diagram of an exemplary embodiment of a method for a mobile device.
Figure 3B:
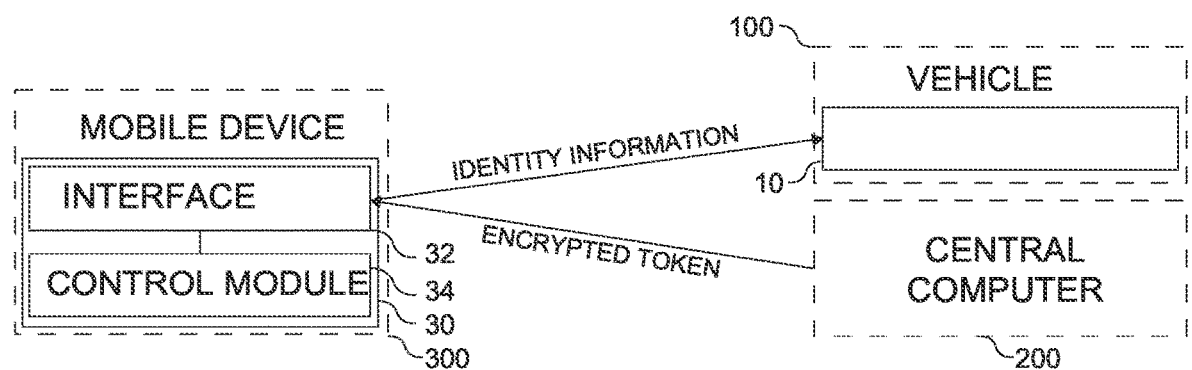
FIG. 3b is a block diagram of an exemplary embodiment of a device for a mobile device.

In exemplary embodiments, the control module 16 (and/or also control modules 24; 34, which are introduced in connection with FIGS. 2b and 3b) may correspond to any desired controller or processor or to a programmable hardware component. For example, the control module 16; 24; 34 may also be realized as software that is programmed for a corresponding hardware component. The control module 16; 24; 34 may therefore be implemented as programmable hardware with correspondingly adapted software. In this context, any desired processors, such as digital signal processors (DSPs) may be used. Exemplary embodiments are not restricted to a specific type of processor in this context. Any number of processors or also a plurality of processors are conceivable for implementing the control module 16; 24; 34.

The at least one interface 14 (and/or also interfaces 22; 32, which are introduced in connection with FIGS. 2b and 3b) may for example correspond to one or more inputs and/or one or more outputs for receiving and/or transmitting information, for example in digital bit values, based on a code, within a module, between modules, or between modules of different entities. In at least some exemplary embodiments, the interfaces 14; 22 and 32 may be designed to communicate via the wireless mobile communication system. In addition, the interfaces 14 and 32 may be designed to communicate via the other wireless communication link (for example the wireless short-range radio communication link).

More details and aspects of the method and of the device 10 will be mentioned in conjunction with the concept or with examples that are described above or below (e.g. FIGS. 2a to 7). The device 10 or method may comprise one or more additional optional features that correspond to one or more aspects of the proposed concept or the described examples as described above or below.

The central server constitutes another component of the teachings herein. Said central server provides the release for the key signal and/or immobilizer signal to the device 10, but it may also communicate with the mobile device. The key signal is then released by means of the device, for example by means of a main processor (the control module) of the device, in conjunction with a trusted platform module (TPM) of the device, and in conjunction with the key chip, which processes the release and processes the key signal and/or the immobilizer signal.

FIG. 2a is a flow diagram of an exemplary embodiment of a method for a central computer 200. The method comprises providing 210 information relating to the release of a key signal or immobilizer signal to a device 10 of a vehicle 100 via a wireless mobile communication system (for example the information introduced in connection with FIG. 1a to 1c and relating to the release of the key signal or of the immobilizer signal). In at least some exemplary embodiments, the central computer provides only one release signal to the device, and the actual release is carried out by the device, for example by means of an interplay between the control module of the device and a TPM of the device and the key chip of the device. The release of the key signal indicates release, by means of the central computer 200, of a function for unlocking or locking a central locking system of the vehicle. Additionally or alternatively, the release of the immobilizer signal indicates release, by means of the central computer, of a function for deactivating or activating an immobilizer. The release relates to a key signal or an immobilizer signal that is provided to an immobilizer module or central locking system of the vehicle via a wireless communication link inside the vehicle if the key signal or immobilizer signal is released by the central computer (for example to the key signal and/or the immobilizer signal, which are introduced in connection with FIG. 1a to 1c).

FIG. 2b is a block diagram of an exemplary embodiment of a (corresponding) device 20 for a central computer 200. FIG. 2b also shows the central computer 200 comprising the device 20. FIG. 2b also shows a system consisting of the central computer 200 comprising the device 20, the vehicle 100 comprising the device 10, and optionally a mobile device 300 comprising a device 30, which is introduced in connection with FIGS. 3a and 3b. The device 20 comprises at least one interface 22 that is designed to communicate via a wireless mobile communication system (for example the wireless mobile communication system introduced in connection with FIG. 1a to 1c). The device 20 comprises a control module 24 that is coupled to the at least one interface. The control module 24 may be designed to carry out the method, for example using the at least one interface. The control module 24 is designed to provide the information relating to the release of a key signal or the immobilizer signal to the device 10 of the device via the wireless mobile communication system.

The following description relates to the method from FIG. 2a and to the device 20 from FIG. 2b.

The method comprises providing 210 (for example transmitting) the information relating to the release of a key signal or the immobilizer signal. The release relates to a key signal or an immobilizer signal that is provided to an immobilizer module or central locking system of the vehicle via the wireless communication link inside the vehicle if the key signal or immobilizer signal is released by the central computer. In this context, the key signal and/or immobilizer signal may be the key signal and/or the immobilizer signal that were introduced in connection with FIG. 1a to 1c. For example, the central computer may provide the information relating to the release of a key signal or the immobilizer signal based on a request of a server of a car-sharing provider or based on a request of a mobile device 300 of a user.

In at least some exemplary embodiments, the information relating to the release of the key signal or of the immobilizer signal includes cryptographic key information. The method may further comprise providing 220 an encrypted token to a mobile device 300 of a user of the vehicle, for example via the wireless mobile communication system. The encrypted token and the cryptographic key information may be based on the same cryptographic key. In other words, the method may comprise generating the cryptographic key information and encrypted token based on the cryptographic key. The cryptographic key may for example be a private key of the central computer. The encrypted token may be provided to the mobile device in order to be forwarded to the device of the vehicle. The encrypted token may for example not be decrypted by the mobile device. However, the mobile device may sign the encrypted token and then forward it signed to the device 10 for the vehicle.

More details and aspects of the method and of the device 20 will be mentioned in conjunction with the concept or with examples that are described above or below (e.g., FIG. 1a to 1c, 3a to 7). The device 20 or method may comprise one or more additional optional features that correspond to one or more aspects of the proposed concept or the described examples as described above or below.

In some exemplary embodiments, a mobile device is provided.

FIG. 3a is a flow diagram of an exemplary embodiment of a method for a mobile device 300. The method comprises providing 310 identity information of a user of a vehicle from the mobile device of the user to a device of the vehicle via a wireless communication link. The identity information is provided to the device 10 of the vehicle in order to be compared with information relating to a user. A key signal or an immobilizer signal shall be released for the user by means of the device 10 based on the identity information if the information relating to the user matches the identity information. If the key signal or immobilizer signal is released, the key signal or immobilizer signal is provided to an immobilizer module or central locking system of the vehicle via a wireless communication link inside the vehicle.

FIG. 3b is a block diagram of an exemplary embodiment of a (corresponding) device 30 for the mobile device. The device 30 comprises at least one interface 32 that is designed to communicate via a wireless communication link (for example the other wireless communication link described in connection with FIG. 1a to 1c). The device 30 comprises a control module 34 that is coupled to the at least one interface. The control module 34 may be designed to carry out the method from FIG. 3a. The control module 34 is designed to provide identity information of a user of a vehicle 100 from the mobile device of the user to a device 10 of the vehicle via the wireless communication link. The identity information is provided to the device of the vehicle in order to be compared with information relating to a user for whom a key signal or an immobilizer signal is to be released, such that the key signal or immobilizer signal is provided to an immobilizer module or central locking system of the vehicle via a wireless communication link inside the vehicle if the information relating to the user matches the identity information.

The following description relates to the method from FIG. 3a and to the device 30 from FIG. 3b.

In some exemplary embodiments, the identity information may, as explained in connection with FIG. 1a to 2b, correspond to an encrypted token. The method may further comprise receiving 320 (or obtaining) the encrypted token from a central computer 200 in order to forward said token to the vehicle (for example by providing/transmitting the encrypted token as identity information to the device 10 of the vehicle). In some exemplary embodiments, the method may further comprise signing the encrypted token based on a private key of the mobile device. The method may further comprise providing the signed version of the encrypted token to the device 10 of the vehicle 100.

More details and aspects of the method and of the device 30 will be mentioned in conjunction with the concept or with examples that are described above or below (e.g., FIG. 1a to 2b, to 7). The device 10 or method may comprise one or more additional optional features that correspond to one or more aspects of the proposed concept or the described examples as described above or below.

At least some exemplary embodiments relate to a CDIS box (Car On Demand Interim Solution, a telematics solution). This may for example correspond to the device 10 that was introduced in connection with FIG. 1a to 1c.

Some vehicles, for example older vehicles, do not have the hardware required for ensuring secure car-sharing use of the vehicles. Since it is disputed from a legal point of view whether a fully functional key may be in the vehicle, the CDIS box provides a telematics solution that only releases a key when a back end (for example the central computer 200), a smartphone (the mobile device 300) and a vehicle communication system (CDIS box) interact and provide authentication.

The CDIS box allows for various user experiences (customer journeys), including for the public car-sharing service. In this case, in a first step, the users are made aware of the car-sharing service via a website or via social media, for example by capturing a QR (Quick Response) code using a mobile device. The user may then register for the service via a smartphone or website and upload the required documents for verifying and activating membership. In a third step, the users may locate and reserve (book) a vehicle and pay a deposit via a payment provider, for example PayPal or AliPay. Personalization is also possible. Once the rental session begins, personalized settings, for example for the infotainment system (a mixture of information and entertainment), for pre-climatizing the vehicle, etc., may be transmitted to the vehicle. In a fifth step, the users may use the vehicle, i.e., for example, open the vehicle using a smartphone application, monitor their route, view associated rental costs, and end the rental session. The users may then pay via the selected payment provider and, for example, invite friends via social media mobile applications.

The so-called CDIS box may be used here. It may for example be used to open and close the vehicle, to mobilize and immobilize the vehicle, and/or to provide access to the comfort vehicle bus (C-CAN, comfort controller area network). The approach for this may be divided into two parts. In a first step, the smartphone may be used to open the vehicle from the outside by means of a direct radio link between the smartphone and the CDIS box. In a second step, the vehicle may be started via the smartphone. In the process, the CDIS box communicates directly (via radio) with the smartphone, with the immobilizer module of the vehicle, with a key module of the vehicle, in order to unlock the immobilizer and red out vehicle data via the C-CAN.

The present teachings (key chip with car-on-demand software) or the CDIS box is a retrofitted car-on-demand telematics solution that may authorize the user to open/close and mobilize the vehicle by means of a smartphone. This is accompanied by authentication and ensuring authorized use of the vehicle. If this is guaranteed, the immobilizer may be deactivated and the client may use the vehicle. In addition, it is possible to read out vehicle information found in the comfort CAN and to view said information on the mobile terminal device (smartphone) via a back end.

For this purpose, the software of a conventional key chip (for example the key chip 12) may be adapted accordingly such that the signals (for example open/close or immobilizer, by means of the key signal and/or the immobilizer signal) are verified and not immediately executed prior to processing by means of the CDIS box. This constitutes an alternative to opening and using the vehicle via a digital key without a mechanical key device or to providing an unencrypted, fully functional vehicle key inside the vehicle.

This may be achieved by means of a modified key chip integrated on the printed circuit board. Said chip may be a modified variant of the key chip used in a conventional vehicle key. The software modification may prevent unauthorized access to the immobilizer secret as well as mobilization of the vehicle. The benefits of this concept are produced by the modification to the key chip integrated on the printed circuit board.

As such, in at least some exemplary embodiments, no write access to the vehicle CAN is required. Protection may be provided against unauthorized use, since the key is encrypted, and therefore this solution may be legally compliant and meet the specifications of insurance companies. In addition, development costs may be spared since an existing chip is used.

In the following, reservation of the vehicle will be described by way of example. In a first step, the client registers themselves in the back end (a central computer or computer center). In step 2, the client reserves the vehicle at a back end of a third party, for example a car-sharing provider. In step 3, the reservation period is transmitted from the back end of the third party (for example via a wireless communication system) to a back end of the vehicle manufacturer. In step 4, the reservation period is transmitted via the smartphone (via a wireless communication system) to the CDIS box of the vehicle. In step 5, the client opens the vehicle via the smartphone via Bluetooth Low Energy. The vehicle data is transmitted via mobile communications. The main functions provided via the CDIS box are the unlocking/locking of the vehicle, the unlocking of the immobilizer, and the access to the vehicle data via the comfort CAN.

Figure 4:
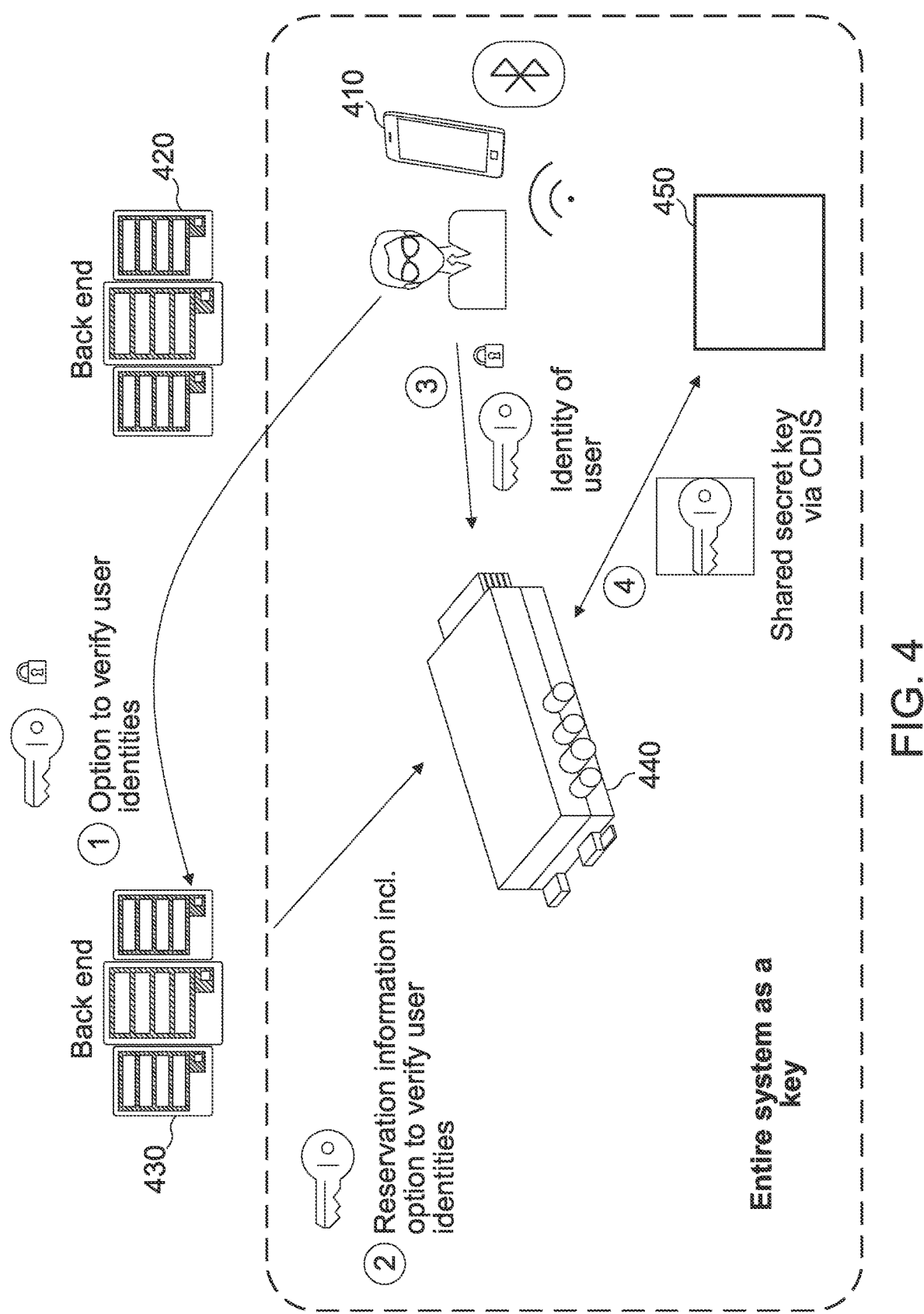
FIG. 4 illustrates a flow of information in a key system.

It may in this case be desirable for the vehicle key to not be in the vehicle. As such, in at least some exemplary embodiments, the entire system consisting of the CDIS box, smartphone of the user, and the back end of the manufacturer and of a car-sharing provider may constitute the key. FIG. 4 illustrates the flow of information in a system of this kind. In a first step, an option to verify the user identities is provided from a mobile device (smartphone) 410 of the user via the back end of the third party 420 to the back end of the manufacturer 430 (for example the central computer 200). In step 2, the reservation information is transmitted together with the option to verify the user identities from the back end of the manufacturer 430 to the CDIS box 440 (for example the device 10). In step 3, the identity (for example the identity information) of the user is transmitted from the mobile device 410 (for example the mobile device 300) of the user to the CDIS box. If the identity of the user matches the user identity verification option, the shared secret key (for example the symmetric key, K.Sym) of the key signal and/or of the immobilizer signal of the key chip 450 is released by means of a control signal of the CDIS box 440 in order to unlock the vehicle and deactivate the immobilizer. Each device may comprise a public and a private key, wherein the public key may be known to the communication partners of the device and the private key is known only to the device itself. Communication with the device may be based on the public key of the device.

Figure 5A:
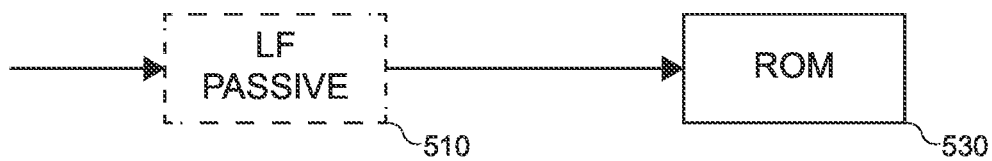
FIGS. 5a and 5b show a schematic flow of information in key chips.
Figure 5B:
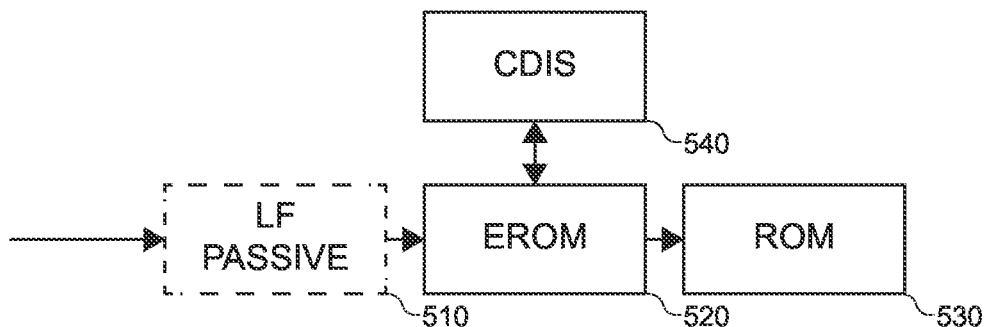

FIGS. 5a and 5b show how the current solution (conventional vehicle key) and the solution involving the CDIS box in the case of an immobilizer signal are implemented. In both cases, the immobilizer secret is stored in the ROM via the firmware of the microcontroller (with manufacturer-specific special functions). In the case of the conventional key, an LF signal containing the request of the immobilizer system to provide the immobilizer signal is obtained via the LF passive module 510 (passive low-frequency module) and forwarded directly to the ROM. Here, the immobilizer secret is read out and provided to the immobilizer system and the immobilizer is unlocked. During implementation with the CDIS box, said LF signal is initially forwarded to the EROM (520) via the LF passive module. In the EROM, it is checked whether release has been granted for the immobilizer signal. In the process, a signal path is established between the EROM and CDIS box 540 (for example the control module 16 of the device 10), which then checks the legitimacy of the unlocking request. If release for use of the vehicle is granted, the signal is forwarded by means of the EROM to the ROM in order to read out the immobilizer secret, thus producing an immobilizer solution that works in a similar way to the conventional solution.

Figure 6:
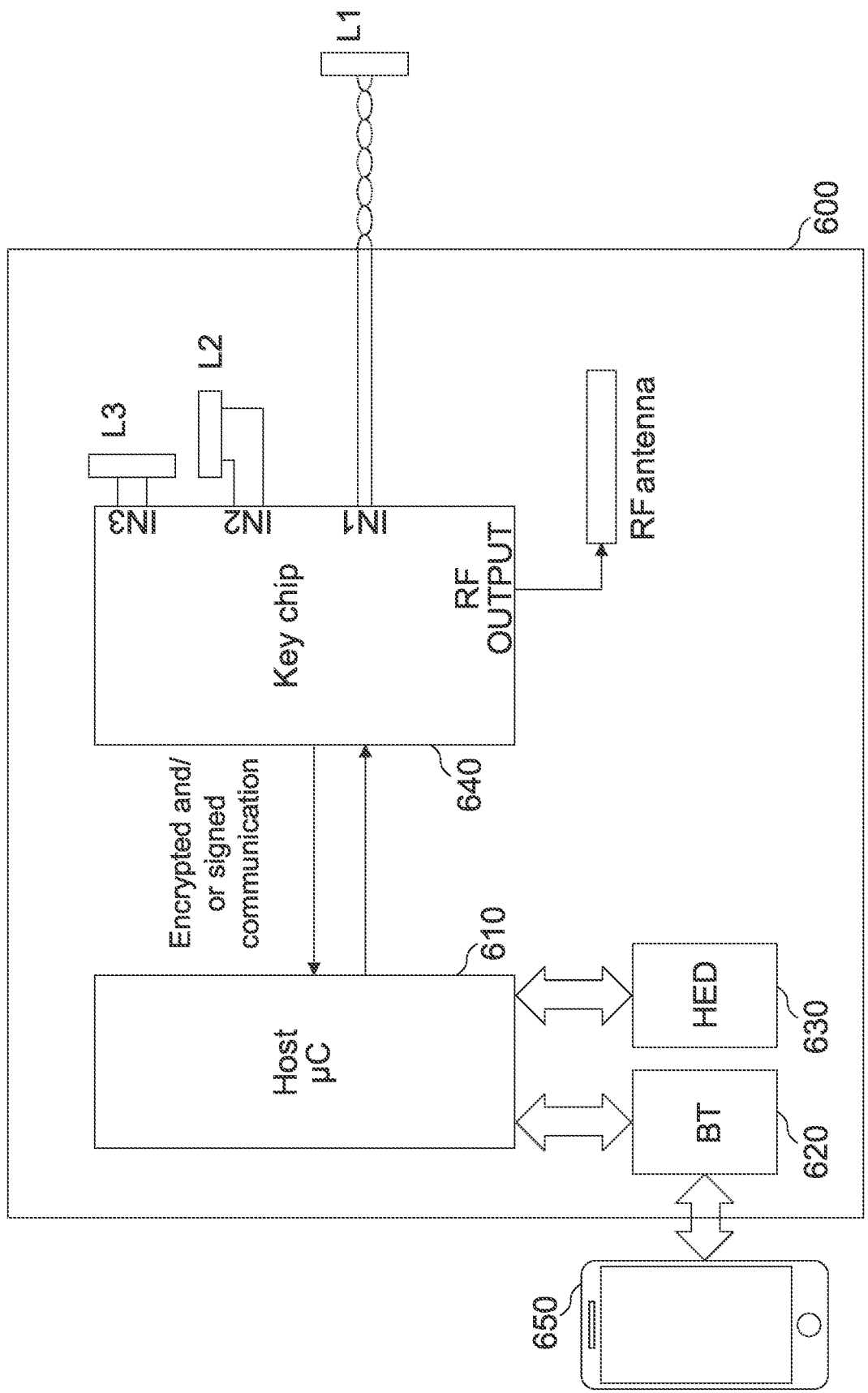
FIG. 6 shows the integration of a key chip in a CDIS box.

FIG. 6 shows the integration of the key chip in the CDIS box 600. The CDIS box may for example comprise the host microcontroller 610, which communicates with a Bluetooth module 620 (which may be designed to communicate via Bluetooth or Bluetooth Low Energy), a hardware encryption device 630 (HED, for example a trusted platform module or a hardware security module (HSM)), and the key chip 640. In this case, the host microcontroller, for example together with the TPM, may correspond to the control module 16, the at least one interface may comprise the Bluetooth module 620, and the key chip 640 may correspond to the key chip 12. The microcontroller communicates with the mobile device 650 (which may correspond to the mobile device 300) via the Bluetooth module 620. The key chip 640 is, for example, coupled to the microcontroller via a serial peripheral interface (SPI). The communication between the microcontroller and key chip is encrypted and/or signed. One aim of this is for secure communication between the car-on-demand logic unit and the key chip (mobilization chip) for the purpose of unlocking the vehicle and for mobilization. As such, in some exemplary embodiments, tampering, such as undesired sending of commands, undesired alteration of commands, or repetition of the commands to the key chip may be prevented. The key chip is coupled to three inductors L1-L3. The inductors L2 and L3 are arranged at a specific angle to one another and may be used for the keyless access system. L1 is coupled to the key chip via a twisted pair cable of max. 3 meters and arranged outside the CDIS box.

Figure 7:
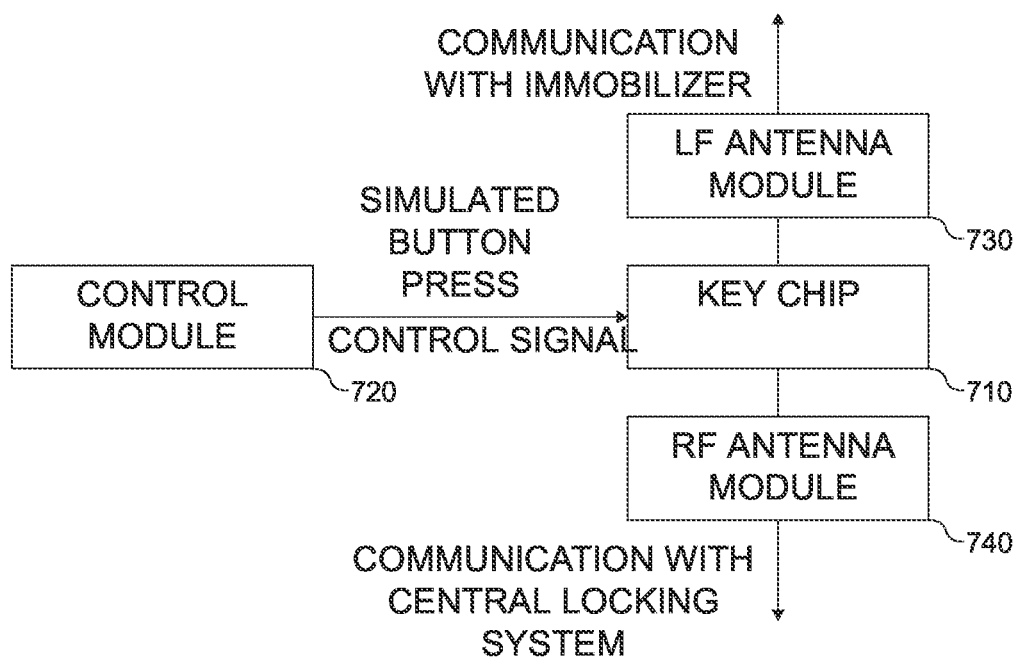
FIG. 7 shows an exemplary embodiment of a connection of a key chip.

FIG. 7 shows an exemplary embodiment of a connection of a key chip 710 (for example the key chip 12). The key chip 710 is coupled to a control module 720 (for example the control module 16), an LF antenna module 730, and an RF antenna module 740. The control module triggers functions of the key chip via simulated button presses and provides a control signal such that the key chip is able to provide the key signal and/or the immobilizer signal. In the process, the key signal is transmitted via the RF antenna module 740, which is designed to communicate with the central locking system, and the immobilizer signal is transmitted via the LF antenna module 730, which is designed to communicate with the immobilizer.

Another exemplary embodiment is a computer program for executing at least one of the above-described methods if the computer program runs on a computer, a processor, or a programmable hardware component. Another exemplary embodiment is a digital storage medium that is machine- or computer-readable, and that has electronically readable control signals which may interact with a programmable hardware component such that one of the above-described methods is executed.

The features disclosed in the above description, the following claims and the accompanying FIGS. may be relevant and implemented in their different embodiments both individually as well as in any combination to realize an exemplary embodiment.

Although many aspects were described in conjunction with a device, it is understood that these aspects also represent a description of the corresponding method, and therefore a block or a component of a device is also to be understood as a corresponding method step or as a feature of a method step. Analogously, aspects that were described in conjunction with or as a method step also represent a description of a corresponding block or details or a feature of a corresponding device.

Depending on specific implementation requirements, exemplary embodiments may be implemented in hardware or in software. The implementation may be performed using a digital storage medium such as a floppy disk, DVD, Blu-ray disc, CD, ROM, PROM, EPROM, EEPROM or flash memory, hard disk, or another magnetic or optical memory on which electronically readable control signals are saved that interact or may interact with a programmable hardware component such that the respective method is performed.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single chip system (SOC=system-on-a-chip), a programmable logic element or a field-programmable gate array with a microprocessor (FPGA=field-programmable gate array).

The digital storage medium may therefore be machine- or computer-readable. Some exemplary embodiments therefore comprise a data carrier that has electronically readable control signals which are capable of interacting with a programmable computer system or a programmable hardware component such that a method described herein is performed. An exemplary embodiment is accordingly a data carrier (or a digital storage medium or a computer-readable medium) on which the program for performing one of the methods described herein is recorded.

In general, exemplary embodiments may be implemented as a program, firmware, computer program or computer program product with a program code or as data, wherein the program code or the data is, or respectively are, effective in performing one of the methods when the program runs on a processor or a programmable hardware component. The program code or the data may for example also be saved on a machine-readable carrier or data carrier. The program code or the data may exist, inter alia, as a source code, machine code or byte code as well as another intermediate code.

Another exemplary embodiment is a stream of data, a signal sequence, or a sequence of signals that represents, or respectively represent, the program for performing one of the methods described herein. The stream of data, the signal sequence or the sequence of signals may for example be configured in order to be transferred via a data communication link, such as via the Internet or another network. Exemplary embodiments are accordingly also signal sequences representing data that are suitable for being transmitted via a network or a data communication link, wherein the data represent the program.

A program according to one exemplary embodiment may implement one of the methods while it is being performed for example in that it reads out memory areas or writes a datum or several data to them, whereby switching processes or other processes are possibly evoked in transistor structures, in amplifier structures or in other components which are electrical, optical or magnetic or which function according to another functional principle. Correspondingly, by reading out a memory area, data, values, sensor values, or other information may be recorded, determined or measured by a program. A program may therefore record, determine or measure quantities, values, measurands and other information by reading out one or more memory areas, and may cause, induce or perform an action by writing to one or more memory areas, or control other units, machines and components.

The above-described exemplary embodiments merely represent an illustration of the principles of the present invention. Of course, modifications and variations of the arrangements and details described herein are apparent to other persons skilled in the art. It is therefore intended that the invention is only restricted by the scope of protection of the following claims, and not by the specific details which were presented herein with reference to the description and the explanation of the exemplary embodiments.

LIST OF REFERENCE NUMERALS

10 Device
12 Key chip
14 At least one interface
16 Control module
20 Device
22 At least one interface
24 Control module
30 Device
32 At least one interface
34 Control module
100 Vehicle
110 Obtaining information relating to the release of a key signal or of an immobilizer signal
120 Communicating with a mobile device
122 Obtaining identity information
130 Providing a control signal
140 Providing a key signal or an immobilizer signal
150 Providing access to functions of a central locking system
160 Providing access to functions of an electric immobilizer
170 Providing data of a vehicle communication system
200 Central computer
210 Providing information relating to the release of a key signal or of an immobilizer signal
220 Providing an encrypted token
300 Mobile device
310 Providing identity information
320 Receiving an encrypted token
410 Mobile device
420 Back end of a third party
430 Back end of a manufacturer
440 CDIS box
450 Key chip
510 LF passive module
520 EROM
530 ROM
540 CDIS box
600 CDIS box
610 Host microcontroller
620 Bluetooth module
630 Key chip
640 TPM module
710 Key chip
720 Control module
730 LF antenna module
740 RF antenna module The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for a device for a vehicle, wherein the device comprises a key chip with tamper-proof firmware, the method comprising:
   obtaining information relating to the release of a key signal or of an immobilizer signal from a central computer via a wireless mobile communication system, wherein the release of the key signal indicates release, by the central computer, of a function for unlocking or locking the vehicle, and/or
   wherein the release of the immobilizer signal indicates release, by the central computer, of a function for deactivating or activating an immobilizer;
   providing a control signal to the key chip based on the information relating to the release of the key signal or of the immobilizer signal, wherein the control signal is designed to allow the key chip to generate the key signal or the immobilizer signal; and
   providing the key signal and/or the immobilizer signal, by the key chip, via a wireless communication link to a central locking system and/or an immobilizer system of the vehicle after the control signal is obtained.

2. The method of claim 1, wherein the key signal is transmitted by the key chip via a wireless high-frequency communication link and/or
   wherein the immobilizer signal is transmitted via a wireless low-frequency communication link.

3. The method of claim 1, wherein the key signal is similar to a wireless key signal of a vehicle key of the vehicle, and/or
   wherein the immobilizer signal is similar to a wireless immobilizer signal of the vehicle key of the vehicle, and/or
   wherein the key chip is similar to a key chip of a vehicle key of the vehicle.

4. The method of claim 1, wherein the method further comprises obtaining identity information of a user of the vehicle from a mobile device of the user via another wireless communication link, wherein the information relating to the release of the key signal includes information relating to the user for whom the key signal and/or the immobilizer signal is to be released, wherein the control signal is provided if the information relating to the user matches the identity information.

5. The method of claim 4, wherein the information relating to the release of the key signal includes information relating to a time period for which the release of the key signal and/or immobilizer signal is granted, wherein the control signal is provided within said time period, and/or
   wherein the information relating to the release of the key signal includes cryptographic key information, wherein the identity information corresponds to an encrypted token, wherein the encrypted token is provided by the central computer, wherein the method further comprises verifying the encrypted token based on the cryptographic key information.

6. The method of claim 1, wherein the method further comprises communicating with a mobile device of the user via another wireless communication link, wherein the method comprises providing the mobile device with access to functions of the central locking system based on the information relating to the release of the key signal, and/or
   wherein the method comprises providing the mobile device with access to functions of an electric immobilizer based on the information relating to the release of the immobilizer signal, and/or
   wherein the method further comprises providing data of a vehicle communication system of the vehicle to the mobile device.

7. The method of claim 1, wherein the immobilizer signal is provided to the immobilizer system of the vehicle in order to deactivate an immobilizer of the vehicle, and/or
   wherein the key signal is provided to the central locking system of the vehicle in order to lock or unlock at least one body panel of the vehicle, and/or
   wherein the immobilizer signal is provided to the immobilizer system of the vehicle in order to enable start-up of the vehicle.

8. A method for a central computer, the method comprising:
   providing information relating to the release of a key signal or of an immobilizer signal a key chip with tamper-proof firmware to a device of a vehicle via a wireless mobile communication system, wherein the release of the key signal indicates release, by the central computer, of a function for unlocking or locking the vehicle, and/or
   wherein the release of the immobilizer signal indicates release, by the central computer, of a function for deactivating or activating an immobilizer,
   wherein the release relates to a key signal or an immobilizer signal that is provided to an immobilizer circuit or central locking system of the vehicle via a wireless communication link inside the vehicle if the key signal or immobilizer signal is released by the central computer.

9. The method of claim 8, wherein the information relating to the release of the key signal or of the immobilizer signal includes cryptographic key information, wherein the method further comprises providing an encrypted token to a mobile device of a user of the vehicle, wherein the encrypted token and the cryptographic key information is based on the same cryptographic key, and wherein the encrypted token is provided to the mobile device in order to be forwarded to the device of the vehicle.

10. A method for a mobile device, the method comprising:
   providing identity information of a user of a vehicle from the mobile device of the user to a device of the vehicle via a wireless communication link, wherein the identity information is provided to the device of the vehicle in order to be compared with information relating to a user for whom a key signal or an immobilizer signal is to be released, such that the key signal or the immobilizer signal is provided by a key chip with a tamper-proof firmware to an immobilizer circuit or central locking system of the vehicle via a wireless communication link inside the vehicle if the information relating to the user matches the identity information.

11. The method of claim 10, wherein the identity information corresponds to an encrypted token, wherein the method further comprises receiving the encrypted token from a central computer in order to forward said token to the vehicle.

12. A non-transitory storage medium comprising instructions that cause a computer, a processor, or a programmable hardware component to perform the method of claim 1.

13. A device for a vehicle, comprising:
a key chip with a tamper-proof firmware;
at least one interface that is configured to communicate via a wireless mobile communication system; and
a control circuit that is configured to:
obtain information relating to the release of a key signal or of an immobilizer signal from a central computer via the wireless mobile communication system, wherein the release of the key signal indicates release, by the central computer, of a function for unlocking or locking the vehicle, and/or wherein the release of the immobilizer signal indicates release, by the central computer, of a function for deactivating or activating an immobilizer, and to
provide a control signal to the key chip based on the information relating to the release of the key signal or of the immobilizer signal, wherein the control signal is configured to allow the key chip to generate the key signal or the immobilizer signal,
wherein key chip is configured to provide the key signal and/or the immobilizer signal to a central locking system and/or an immobilizer system of the vehicle via a wireless communication link after obtaining the control signal.

14. A device for a central computer, the device comprising:
at least one interface that is configured to
communicate via a wireless mobile communication system; and
a control circuit that is configured to:
provide information to a device of a vehicle via the wireless mobile communication system, the information relating to a release of a key signal or of an immobilizer signal by a key chip with tamper-proof firmware;
wherein the release of the key signal indicates release, by the central computer, of a function for unlocking or locking the vehicle; and/or
wherein the release of the immobilizer signal indicates release, by the central computer, of a function for deactivating or activating an immobilizer, wherein the release relates to a key signal or to an immobilizer signal that is provided to an immobilizer circuit or central locking system of the vehicle via a wireless communication link inside the vehicle if the key signal or immobilizer signal is released by the central computer.

15. A device for a mobile device, the device comprising:
at least one interface that is configured to communicate via a wireless communication link; and
a control circuit that is configured to:
provide identity information of a user of a vehicle from the mobile device of the user to a device of the vehicle via the wireless communication link, wherein the identity information is provided to the device of the vehicle in order to be compared with information relating to a user for whom a key signal or an immobilizer signal is to be released by a key chip with tamper-proof firmware, such that the key signal or immobilizer signal is provided to an immobilizer circuit or central locking system of the vehicle by the key chip via a wireless communication link inside the vehicle if the information relating to the user matches the identity information.

16. The method of claim 2, wherein the key signal is similar to a wireless key signal of a vehicle key of the vehicle, and/or
wherein the immobilizer signal is similar to a wireless immobilizer signal of the vehicle key of the vehicle, and/or
wherein the key chip is similar to a key chip of a vehicle key of the vehicle.

17. The method of claim 2, wherein the method further comprises obtaining identity information of a user of the vehicle from a mobile device of the user via another wireless communication link, wherein the information relating to the release of the key signal includes information relating to the user for whom the key signal and/or the immobilizer signal is to be released, wherein the control signal is provided if the information relating to the user matches the identity information.

18. A non-transitory storage medium comprising instructions that cause a computer, a processor, or a programmable hardware component to perform the method of claim 8.

19. A non-transitory storage medium comprising instructions that cause a computer, a processor, or a programmable hardware component to perform the method of claim 10.

20. The method of claim 1, wherein the device is a retrofit solution for a vehicle.

* * * * *